(12) United States Patent
Hiramatsu et al.

(10) Patent No.: US 11,041,566 B2
(45) Date of Patent: Jun. 22, 2021

(54) SEAL STRUCTURE, SEALING METHOD, AND COUPLING EQUIPPED WITH SAID SEAL STRUCTURE

(71) Applicant: FUJIKIN INCORPORATED, Osaka (JP)

(72) Inventors: Koji Hiramatsu, Osaka (JP); Michio Yamaji, Osaka (JP); Kunihiko Daido, Osaka (JP); Tadayuki Yakushijin, Osaka (JP); Yasumasa Yanagida, Osaka (JP); Takashi Funakoshi, Osaka (JP)

(73) Assignee: FUJIKIN INCORPORATED, Osaka (JP)

( * ) Notice: Subject to any disclaimer, the term of this patent is extended or adjusted under 35 U.S.C. 154(b) by 123 days.

(21) Appl. No.: 16/345,252

(22) PCT Filed: Oct. 26, 2017

(86) PCT No.: PCT/JP2017/038598
§ 371 (c)(1),
(2) Date: Apr. 26, 2019

(87) PCT Pub. No.: WO2018/079632
PCT Pub. Date: May 3, 2018

(65) Prior Publication Data
US 2019/0293178 A1 Sep. 26, 2019

(30) Foreign Application Priority Data

Oct. 31, 2016 (JP) .............................. JP2016-212814

(51) Int. Cl.
*F16J 15/06* (2006.01)
*F16J 15/08* (2006.01)
(Continued)

(52) U.S. Cl.
CPC ............. *F16J 15/062* (2013.01); *F16J 15/06* (2013.01); *F16J 15/0806* (2013.01);
(Continued)

(58) Field of Classification Search
CPC ... F16L 19/0218; F16L 23/20; F16L 19/0212; Y10S 285/917; F16J 15/062; F16J 15/08; F16J 15/0881
See application file for complete search history.

(56) References Cited

U.S. PATENT DOCUMENTS 1,834,581 A * 12/1931 Dent ...................... F16L 23/20
285/328
3,301,578 A * 1/1967 Platt ........................ F16L 23/20
285/331
(Continued)

FOREIGN PATENT DOCUMENTS

| CN | 102016364 A | 4/2011 |
|---|---|---|
| JP | 2001-516862 A | 10/2001 |

(Continued)

OTHER PUBLICATIONS

International Search Report dated Jan. 9, 2018, issued for PCT/JP2017/038598.
(Continued)

*Primary Examiner* — Nicholas L Foster
(74) *Attorney, Agent, or Firm* — Locke Lord LLP

(57) ABSTRACT

Provided are a seal structure in which sealing performance is ensured over a long period of time even when it is used for low-temperature fluids, a sealing method, and a coupling including the seal structure. The seal structure includes an annular gasket interposed between a first member and a second member. The first member is provided on its surface facing the gasket with: a first surface located on the inner diameter side; a first annular protrusion located on the outer
(Continued)

diameter side of the first surface; a second surface located on the outer diameter side of the first protrusion; a second annular protrusion located on the outer diameter side of the second surface and having a greater protruding amount with respect to the second surface than that of the first protrusion; and a third surface located on the outer diameter side of the second protrusion.

7 Claims, 2 Drawing Sheets

(51) Int. Cl.
*F16L 19/02* (2006.01)
*F16L 23/20* (2006.01)

(52) U.S. Cl.
CPC ....... *F16J 15/0818* (2013.01); *F16L 19/0218* (2013.01); *F16L 19/0212* (2013.01); *F16L 23/20* (2013.01); *Y10S 285/917* (2013.01)

(56) References Cited

U.S. PATENT DOCUMENTS

| | | | |
|---|---|---|---|
| 3,503,634 A | | 3/1970 | Cadiou |
| 3,747,963 A | * | 7/1973 | Shivak ................ F16L 23/20 285/336 |
| 9,512,946 B2 | * | 12/2016 | Karasawa ............ F16L 29/007 |
| 2001/0040378 A1 | | 11/2001 | Babuder et al. |
| 2004/0090016 A1 | * | 5/2004 | Sharp ..................... F16L 23/16 277/603 |
| 2007/0040337 A1 | * | 2/2007 | Wu ....................... F16L 23/20 277/616 |
| 2011/0031745 A1 | | 2/2011 | Nakata et al. |
| 2013/0299726 A1 | * | 11/2013 | Karasawa ............ F16K 27/003 251/148 |

FOREIGN PATENT DOCUMENTS

| | | |
|---|---|---|
| JP | 2002-310300 A | 10/2002 |
| JP | 2009-074619 A | 4/2009 |
| JP | 2010-090939 A | 4/2010 |
| JP | 2015-175518 A | 10/2015 |
| JP | 2016-014468 A | 1/2016 |

OTHER PUBLICATIONS

Office Action dated Nov. 26, 2019, issued for the corresponding Chinese Patent Application No. 201780065703.4 and English translaiotn thereof (excluding the Search Report).

Office Action dated Aug. 26, 2020 and the Search Report, issued for the corresponding CN patent application No. 201780065703.4 and an English translation of the Office Action.

* cited by examiner

SEAL STRUCTURE, SEALING METHOD, AND COUPLING EQUIPPED WITH SAID SEAL STRUCTURE

CROSS REFERENCE TO RELATED APPLICATIONS

This application is related to co-pending application: "SEAL STRUCTURE, SEALING METHOD, AND COUPLING EQUIPPED WITH SAID SEAL STRUCTURE" filed even date herewith in the names of Koji HIRAMATSU, Michio YAMAJI, Kunihiko DAIDO, Tadayuki YAKUSHI-JIN, Yasumasa YANAGIDA and Takashi FUNAKOSHI, a national phase entry of PCT/JP2017/038599, which application is assigned to the assignee of the present application and is incorporated by reference herein.

TECHNICAL FIELD

The present invention relates to a seal structure used for a coupling or the like having a built-in check valve mechanism, a sealing method, and a coupling equipped with the seal structure.

BACKGROUND ART

A well-known coupling includes: first and second coupling members respectively having fluid passages that are in communication with each other; a seal member (O-ring, gasket, or the like) placed at a butt portion of both coupling members; and a fastening means (nut or the like) for joining together the coupling members.

The greatest challenge for the coupling is improvement of its sealing performance. Patent Literature 1 discloses a seal structure used for a high-pressure pipe joint, in which an annular gasket is provided and each coupling member is provided on a surface facing the gasket with a first annular protrusion and is provided on an outer diameter side of the first protrusion with a second annular protrusion for preventing co-rotation.

Further, a known coupling, in some cases, has a built-in check valve mechanism including a plug body and a biasing member that urges the plug body, which is referred to as an inline type check valve or the like (Patent Literature 2). According to Patent Literature 2, a packing is interposed at a butt portion of a first member and a second member.

CITATION LIST

Patent Literature

Patent Literature 1: Japanese Unexamined Patent Application Publication JP-A-2016-14468
Patent Literature 2: Japanese Unexamined Patent Application Publication JP-A-2015-175518

SUMMARY OF INVENTION

Technical Problem

Couplings are used under various conditions where ensuring sealing performance is difficult, and one of such conditions is a low-temperature condition. Under the low-temperature condition, low-temperature fluids (for example, liquid nitrogen, liquid oxygen, liquid helium, liquid hydrogen, etc.) are caused to flow repeatedly, and deterioration of sealing performance due to contraction associated with temperature cycling is therefore a matter of concern. In the check valve disclosed in Patent Literature 2, the packing used as a seal member has a sealing performance problem when used for low-temperature fluids.

In addition, Patent Literature 1, which describes the seal structure provided on the butt surface with two protrusions, has a sealing performance problem, because in the case where the seal structure is used during temperature cycling under a low-temperature condition, the sealing performance by the inner-side protrusion decreases and the sealing performance by the outer-side protrusion having the identical shape as that of the inner-side protrusion also decreases.

An object of the present invention is to provide a seal structure in which sealing performance is ensured over a long period of time even when it is used for low-temperature fluids, a sealing method, and a coupling provided with the seal structure.

Solution to Problem

The seal structure in accordance with the present invention is a seal structure provided at a butt portion of a first member and a second member respectively having fluid passages that are in communication with each other, the seal structure constituted by part of the first member and the second member, the seal structure including an annular gasket interposed between the first member and the second member, at least one of the first member and the second member being provided, on its surface facing the gasket, with: a first surface located on an inner diameter side of the surface facing the gasket; a first annular protrusion located on an outer diameter side of the first surface; a second surface located on the outer diameter side of the first protrusion; a second annular protrusion located on the outer diameter side of the second surface and having a greater protruding amount with respect to the second surface than that of the first protrusion; and a third surface located on the outer diameter side of the second protrusion, and the first protrusion and the second protrusion digging into the gasket, and at least the second surface pressing against the gasket.

The first and second members may be fastened by an appropriate fastening means. The fastening means may be designed such that, for example, a male screw portion is formed on either one of the first and second coupling members, and the first and second coupling members are joined together with a cap nut on which the male screw portion of the coupling member is screwed. Alternatively, the fastening means maybe designed such that the first and second coupling members are sleeves with no male screw portions formed, and the first and second coupling members are joined together with a male screw member, which is a separate member, and a cap nut. In addition, the first and second coupling members may be designed such that one of the coupling members is provided with a bolt insertion hole and the other of the coupling members is provided with a female screw portion whereby both members are joined together with a bolt.

The gasket generally has two side surfaces that are orthogonal to the central axis of the gasket, is rectangular in cross section, and consists of: according to needs, for example, a large diameter portion; and a small diameter portion having an inner diameter equal to that of the large diameter portion and having an outer diameter smaller than that of the large diameter portion. The side surface of the gasket maybe a conical surface where the radius is getting greater as the gasket approaches the gasket-facing surface of the coupling member so that the side surface of the gasket firstly comes into contact with the second protrusion. In addition, the gasket may be provided with an annular recessed portion corresponding to the protrusion of the coupling member.

The first and second members are, for example, made of stainless steel such as SUS 316 whereas the gasket is made of metal such as a nickel alloy and stainless steel, but they are not limited thereto.

The first and second protrusions each have the shape of, for example, a circular arc in cross section, but may be a trapezoid, or any other shape in cross section.

Surfaces that face the gasket, of the first and second members may be identical to each other. Alternatively, only either one of the surfaces may be shaped as described above whereas the other one may be a flat surface orthogonal to the fluid passage.

Regarding the first surface, the second surface, and the third surface, of the surface that faces the gasket, they are configured such that only the first surface, only the second surface, or both of the first and second surfaces press against the gasket. Moreover, preferably, the second surface protrudes more than the first surface and the third surface, where the second surface is pressed against the gasket thereby contributing to sealing whereas the first surface suppresses great deformation at the inner edge portion of the gasket but does not contribute to sealing.

The sealing method in accordance with the present invention is a sealing method at the time of fastening a screw to connect a first member and a second member respectively having fluid passages that are in communication with each other, the sealing method including the steps of, interposing an annular gasket between the first member and the second member, providing at least one of the first member and the second member, on its surface facing the gasket, with: a first surface located on an inner diameter side of the surface facing the gasket; a first annular protrusion located on an outer diameter side of the first surface; a second surface located on the outer diameter side of the first protrusion and protruding more than the first surface; a second annular protrusion located on the outer diameter side of the second surface and having a greater protruding amount with respect to the second surface than that of the first protrusion; and a third surface located on the outer diameter side of the second protrusion and recessed compared to the second surface, and associated with the tightening of the screw, first bringing the second protrusion into contact with a side surface of the gasket, then bringing the first protrusion into contact with the side surface of the gasket, and thereafter bringing the second surface into contact with the gasket.

With the sealing method in accordance with the present invention, even after the second surface is brought into contact with the gasket, further tightening is performed by some amount, whereby the first protrusion and the second protrusion bite into the gasket and a state in which the second surface presses against the gasket is obtained.

In the seal structure and the sealing method in accordance with the present invention, in the case where a low-temperature fluid is caused to flow through the fluid passage, the inner side protrusion, which is closer to the fluid passage, and a part of the gasket corresponding to the protrusion contract. Therefore, in a case where the seal structure is repeatedly subjected to temperature cycling under a low-temperature condition, decrease in sealing performance by the inner side protrusion becomes a matter of concern. With the seal structure and the sealing method in accordance with the present invention, even in the case where the seal structure is used during temperature cycling under a low-temperature condition whereby sealing performance by the inner side protrusion decreases, sealing performance is ensured because the second surface presses against the gasket. Moreover, because the outer side protrusion has a greater biting amount with respect to the gasket than that of the inner side protrusion, even when the seal structure continues to be subjected to temperature cycling under the low-temperature condition after the decrease in sealing performance by the inner side protrusion, sealing performance is maintained over a long period of time.

The coupling in accordance with the present invention is a coupling including: a first member and a second member respectively having fluid passages that are in communication with each other; a fastening means configured to join together the first member and the second member; and a seal structure provided at a butt portion of the first member and the second member, the seal structure being one as described above.

With the coupling in accordance with the present invention, excellent long-term sealing performance is obtained at the time of use during temperature cycling under a low-temperature condition. The coupling is, for example, a pipe joint, but is not limited thereto. The coupling has a built-in check valve mechanism, in some cases.

The check valve mechanism has a plug body and a biasing member that urges the plug body. The check valve mechanism is configured such that : the plug body urged by the biasing member comes into contact with a face to be sealed whereby an opening of the fluid passage of one of the first and second members are in a shutoff state; whereas when a fluid pressure greater than or equal to a predetermined value is applied within the fluid passage, the plug body moves against a biasing force of the biasing member whereby an open state is obtained.

By applying the above-described seal structure to a coupling including a check valve mechanism, excellent long-term sealing performance of the check valve is obtained at the time of use during temperature cycling under a low-temperature condition.

Advantageous Effects of Invention

With the seal structure, the sealing method, and the coupling in accordance with the present invention, even in the case where the coupling is used during temperature cycling under a low-temperature condition whereby sealing performance by the inner side protrusion is decreased, sealing performance is ensured because the second surface presses against the gasket. Moreover, because the outer side protrusion has a greater biting amount with respect to the gasket than that of the inner side protrusion, even when the coupling continues to be subjected to temperature cycling under the low-temperature condition after the decrease in sealing performance by the inner side protrusion, sealing performance is maintained over a long period of time.

REFERENCE SIGNS LIST

Figure 1:
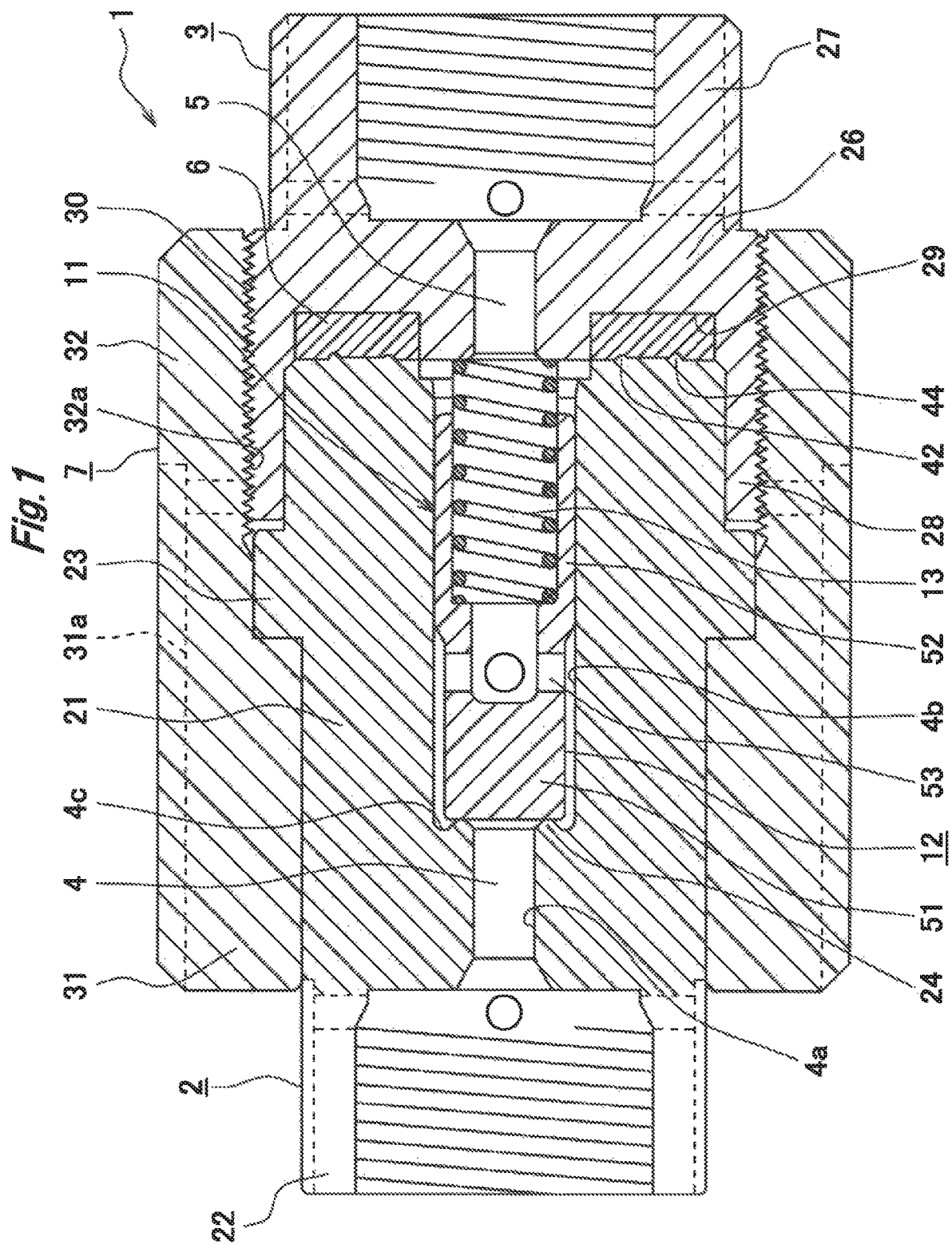
FIG. 1 is a longitudinal sectional view showing a seal structure, a sealing method, and a coupling equipped with the seal structure, according to one embodiment of the present invention.

1: coupling
2: first coupling member (first member)

3: second coupling member (second member)
4: fluid passage
5: fluid passage
6: gasket
7: nut
11: check valve mechanism
41: first surface
42: first protrusion
43: second surface
44: second protrusion
45: third surface

DESCRIPTION OF EMBODIMENTS

Embodiments of the present invention will be described below with reference to the drawings. In the following description, the left and right sides of FIG. 1 are referred to as left and right sides, respectively.

FIG. 1 shows a coupling 1 having a built-in check valve mechanism 11.

The coupling 1 includes: first and second coupling members 2, 3 respectively having fluid passages 4, 5 that are in communication with each other; an annular gasket 6 placed at a butt portion of the first coupling member 2 and the second coupling member 3; and a cap nut 7 for fastening the first coupling member 2 and the second coupling member 3.

The check valve mechanism 11 includes: a plug body 12 disposed in the first coupling member 2; and a biasing member 13 for urging the plug body 12.

The first coupling member 2 includes: a body 21; a female screw portion 22 used for pipe connection and provided at a left end of the body 21; and a flange portion 23 provided on an outer periphery, at a right portion, of the body 21.

The fluid passage 4 of the first coupling member 2 consists of: a small diameter portion 4a that is in communication with the female screw portion 22 via a tapered portion provided at the left end; and a large diameter portion 4b that is contiguous with the right side of the small diameter portion 4a via a stepped portion 4c. The stepped portion 4c is provided with an annular protrusion (seat) 24 receiving a left end surface of the plug body 12.

The second coupling member 3 includes: a body 26; a female screw portion 27 used for pipe connection and provided at a right end of the body 26; and a leftward protruding portion 28 provided at an outer peripheral portion of a left surface of the body 26.

The fluid passage 5 of the second coupling member 3 is in communication with an inside of the female screw portion 27 via a tapered portion provided at the right end. The body 26 of the second coupling member 3 is provided on a left surface thereof with a recess 29 for accommodating the gasket 6.

The gasket 6 has an effect of providing sealing performance by plastic deformation, has a platelike shape having a square cross section, and is accommodated in the recess 29 of the body 26 of the second coupling member 3.

The body 26 and the leftward protruding portion 28 of the second coupling member 3 are provided, on the outer periphery, with a male screw portion 30. The male screw portion 30 is formed so as to protrude radially outward slightly more than an outer peripheral surface of the flange portion 23 of the first coupling member 2.

The cap nut 7 includes: a small diameter portion 31 having an inner diameter that is slightly greater than an outer diameter of the body 21 of the first coupling member 2; and a large diameter portion 32 having an outer diameter that is equal to that of the small diameter portion 31 and having an inner diameter that is slightly greater than the flange portion 23 of the first coupling member 2. The large diameter portion 32 is provided on an inner periphery thereof with a female screw portion 32a. The small diameter portion 31 and part of the large diameter portion 32 contiguous with the small diameter portion 31 are provided with a hexagonal prism portion 31a with which a fastening tool such as a spanner is engaged.

The cap nut 7 is fitted on the first coupling member 2 from the left side, and the female screw portion 32a of the cap nut 7 is screwed on the male screw portion 30 of the second coupling member 3. And the right surface (stepped portion formed between the small diameter portion 31 and the large diameter portion 32) of the small diameter portion 31 comes into contact with the flange portion 23 of the first coupling member 2 whereby the small diameter portion 31 is prevented from moving further in the right direction. In this state, the cap nut 7 is fastened with a fastening tool by a predetermined amount whereby the first coupling member 2 and the second coupling member 3 are properly joined together.

At this time, the right end surface of the first coupling member 2 is pressed against the gasket 6 to plastically deform the gasket 6 whereby a required sealing performance are secured between the first coupling member 2 and the second coupling member 3.

The plug body 12 consists of: a columnar portion 51 by which a fluid escape passage 53 serving as a fluid passage in an open state is formed; and a large-diameter tubular portion 52 being contiguous with the right side (base end side) of the columnar portion 51 and having an outer diameter that is greater than that of the columnar portion 51.

When the left surface of the columnar portion 51 of the plug body 12 is brought into contact with a distal end of the annular protrusion 24 of the first coupling member 2, the plug body 12 causes a right end opening of the fluid passage 4 of the first coupling member 2 to be in a shutoff state.

The fluid escape passage 53 of the columnar portion 51 is formed so as to lead a fluid around an outer peripheral surface of the columnar portion 51 to an inside of the large-diameter tubular portion 52.

The biasing member 13 is a tubular compression coil spring, which has a left end surface that is received by the right surface of the columnar portion 51 of the plug body 12, and a right end surface that is received by the left surface of the body 26 of the second coupling member 3.

With this check valve mechanism 11, in the state shown in FIG. 1, the left surface of the columnar portion 51 of the plug body 12 that is urged by the biasing member 13 comes into contact with the annular protrusion 24 of the first coupling member 2 from the right whereby the shutoff state is obtained. A fluid is introduced into the small diameter portion 4a of the fluid passage 4 of the first coupling member 2. During a period in which the pressure of this fluid is less than the biasing force by the biasing member 13, the shutoff state is maintained. And when the fluid pressure becomes great, the plug body 12 moves rightward against the biasing force of the biasing member 13 due to the increased fluid pressure, which forms a passage running from an opening of the small diameter portion 4a of the fluid passage 4 of the first coupling member 2 through an outer periphery of the columnar portion 51 of the plug body 12, then running from the fluid escape passage 53 of the columnar portion 51 of the plug body 12 through an inside of the large-diameter tubular portion 52, and leading to an inside of the fluid passage 5 of the second coupling member 3, whereby an open state is obtained.

Figure 2:
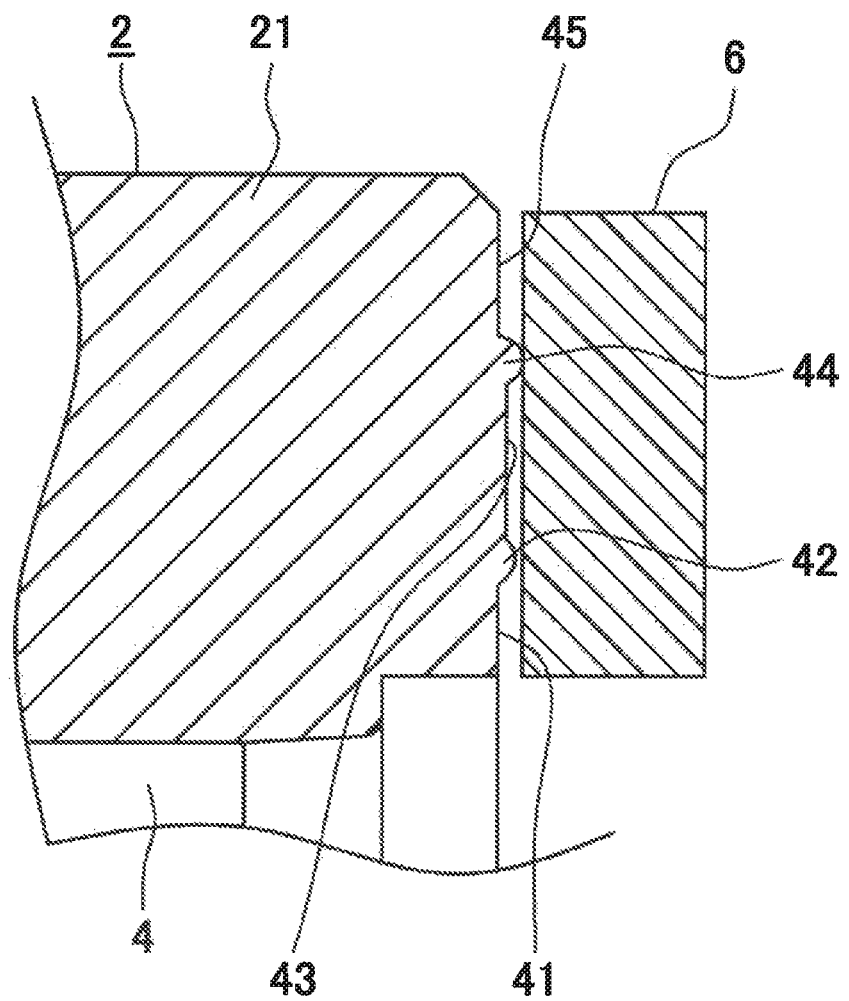
FIG. 2 is an enlarged longitudinal sectional view showing the principal components of the seal structure, which shows a state in which a nut is fastened by fingers.

The first coupling member 2 is provided on the right end surface with two annular protrusions 42, 44. As shown in FIG. 2 in an enlarged manner, the first coupling member 2 is provided on the right end surface with: a first surface 41 located on the inner diameter side; a first annular protrusion 42 located on the outer diameter side of the first surface 41; a second surface 43 located on the outer diameter side of the first protrusion 42; a second protrusion 44 protruding from the second surface 43, and a third surface 45 located on the outer diameter side of the second protrusion 44.

The second surface 43 protrudes slightly more than the first surface 41, and the third surface 45 is slightly recessed compared to the second surface 43. In addition, the second surface 43 has an area larger than the first surface 41. The protruding amount of the second protrusion 44 with respect to the first surface 41 is greater than the protruding amount of the first protrusion 42 with respect to the first surface 41.

FIG. 1 shows a fastening completion state in which the cap nut 7 is fastened with a fastening tool by a predetermined amount, where the first protrusion 42 and the second protrusion 44 dig into the gasket 6 and at least one (preferably, the second surface 43 only) of the first surface 41, the second surface 43, and the third surface 45 presses against the gasket 6. FIG. 2 shows a state in which the cap nut 7 is fastened by fingers, where the second protrusion 44 comes into contact with the gasket 6 and a gap is formed between the first protrusion 42 and the gasket 6.

It should be noted that, in FIG. 1 and FIG. 2, the dimensions of the first surface 41, the first protrusion 42, the second surface 43, the second protrusion 44, and the third surface 45 are shown in an exaggerated manner for the sake of clarity.

As one example of the specific dimensions, the first protrusion 42 protrudes more than the first surface 41 by 0.14 mm, the second surface 43 is recessed compared to the first protrusion 42 by 0.10 mm, the second protrusion 44 protrudes more than the second surface 43 by 0.13 mm, and the third surface 45 is recessed compared to the second protrusion 44 by 0.21 mm. In addition, the shape of the cross section of each protrusion 42, 44 is an arc of a circle with a radius of 0.5 mm.

With the above-described coupling 1, in the case of fastening the cap nut 7, first, the cap nut 7 is fastened by fingers, whereby the second protrusion 44 comes into contact with a side surface of the gasket 6. Thereafter, when the cap nut 7 is fastened using a tool, the second protrusion 44 starts digging into the side surface of the gasket 6, and the first protrusion 42 comes into contact with the side surface of the gasket 6. When the cap nut 7 is further fastened, the first protrusion 42 and the second protrusion 44 dig into the side surface of the gasket 6, and the second surface 43 comes into contact with the gasket 6. Thereafter, when the cap nut 7 is further fastened, the second surface 43 presses against the gasket 6, and the first surface 41 almost comes into contact with the side surface of the gasket 6. The fastening amount is preferably set so as not to press the first surface 41 against the side surface of the gasket 6, and in such a state, fastening is completed.

In the above-described state, the protruding amount of the first protrusion 42 from the right end surface of the first coupling member 2, the degree of inclination of the first surface 41 and the second surface 43, and the relative recessed amount of the first surface 41 and the second surface 43 with respect to each other are designed such that the first protrusion 42, the second surface (surface on the outer diameter side) 43, and the first surface (surface on the inner diameter side) 41, in this order, sequentially come into contact with the gasket 6. The second surface 43 is designed so as to serve as a seal in a state where the second protrusion 44 bites into the gasket 6, and serves as a seal even when the sealing performance by the first protrusion 42 is decreased due to temperature cycling, or the like.

INDUSTRIAL APPLICABILITY

Using the seal structure, the sealing method, and the coupling in accordance with the present invention improves sealing performance under a low-temperature condition, thereby contributing to the safety during use of low-temperature fluids.

The invention claimed is:

1. A seal structure provided at a butt portion of a first member and a second member respectively having fluid passages that are in communication with each other, the seal structure constituted by part of the first member and the second member,
    the seal structure comprising: an annular gasket interposed between the first member and the second member, at least one of the first member and the second member being provided on its surface facing the gasket with: a first surface located on an inner diameter side of the surface facing the gasket; a first annular protrusion located on an outer diameter side of the first surface; a second surface located on the outer diameter side of the first protrusion; a second annular protrusion located on an outer diameter side of the second surface and having a greater protruding amount with respect to the second surface than that of the first protrusion; and a third surface located on the outer diameter side of the second protrusion, and
    the first protrusion and the second protrusion digging into the gasket, and at least the second surface pressing against the gasket.

2. The seal structure according to claim 1, wherein the second surface protrudes more than the first surface and the third surface.

3. A sealing method at a time of fastening a screw to connect a first member and a second member respectively having fluid passages that are in communication with each other, the sealing method comprising the steps of: interposing an annular gasket between the first member and the second member, providing at least one of the first member and the second member on its surface facing the gasket with: a first surface located on an inner diameter side of the surface facing the gasket; a first annular protrusion located on an outer diameter side of the first surface; a second surface located on the outer diameter side of the first protrusion and protruding more than the first surface; a second annular protrusion located on an outer diameter side of the second surface and having a greater protruding amount with respect to the second surface than that of the first protrusion; and a third surface located on the outer diameter side of the second protrusion and recessed compared to the second surface, and
    associated with the tightening of the screw, first bringing the second protrusion into contact with a side surface of the gasket, then bringing the first protrusion into contact with the side surface of the gasket, and thereafter bringing the second surface into contact with the gasket.

4. A coupling comprising: the seal structure of claim 1 and a fastening means configured to join together the first member and the second member.

5. The coupling according to claim 4, having a built-in check valve mechanism.

6. A coupling comprising: the seal structure of claim 2 and a fastening means configured to join together the first member and the second member.

7. The coupling according to claim 6, having a built-in check valve mechanism.

\* \* \* \* \*